United States Patent
Piccinini

(10) Patent No.: US 8,593,004 B2
(45) Date of Patent: Nov. 26, 2013

(54) APPARATUS FOR PRODUCING ELECTRIC OR MECHANICAL ENERGY FROM WAVE MOTION

(75) Inventor: Giuseppe Raoul Piccinini, Evelina (IT)

(73) Assignees: A.P. SISTEM di Piccinini Alberto, Gottolengo (Brescia) (IT); Neris Zelioli, Gottolengo (Brescia) (IT)

( * ) Notice: Subject to any disclaimer, the term of this patent is extended or adjusted under 35 U.S.C. 154(b) by 4 days.

(21) Appl. No.: 13/391,664

(22) PCT Filed: Aug. 18, 2010

(86) PCT No.: PCT/IT2010/000372
§ 371 (c)(1),
(2), (4) Date: Feb. 22, 2012

(87) PCT Pub. No.: WO2011/024209
PCT Pub. Date: Mar. 3, 2011

(65) Prior Publication Data
US 2012/0235413 A1 Sep. 20, 2012

(30) Foreign Application Priority Data
Sep. 25, 2009 (IT) .............................. BS2009A0157

(51) Int. Cl.
*F03B 13/00* (2006.01)
(52) U.S. Cl.
USPC .............................................. 290/42; 290/53
(58) Field of Classification Search
USPC ..................................................... 290/42, 53
See application file for complete search history.

(56) References Cited

U.S. PATENT DOCUMENTS

| | | | |
|---|---|---|---|
| 1,864,499 A | 11/1927 | Grigsby | |
| 4,392,060 A | 7/1983 | Ivy | |
| 6,020,653 A * | 2/2000 | Woodbridge et al. | 290/53 |
| 7,683,500 B2 * | 3/2010 | Greenspan et al. | 290/53 |
| 8,084,877 B1 * | 12/2011 | Raisch | 290/53 |
| 8,319,359 B2 * | 11/2012 | Akervoll | 290/42 |
| 2007/0018458 A1 * | 1/2007 | Martinez | 290/53 |
| 2008/0100065 A1 * | 5/2008 | Lee | 290/53 |
| 2009/0212562 A1 * | 8/2009 | Jaugilas | 290/42 |

FOREIGN PATENT DOCUMENTS

| | | |
|---|---|---|
| CH | 543 004 A | 10/1973 |
| GB | 1 116 689 | 6/1968 |
| JP | 58 062380 A | 4/1983 |
| WO | 2006/109024 | 10/2006 |
| WO | 2008/111845 A2 | 9/2008 |
| WO | 2008/115066 A2 | 9/2008 |

* cited by examiner

*Primary Examiner* — Tho D Ta
(74) *Attorney, Agent, or Firm* — McGlew and Tuttle, P.C.

(57) ABSTRACT

The invention concerns an apparatus for generating power, in particular electric energy, from wave motion in water basins. It comprises at least an operating unit, including gearing provided for unidirectional rotation and to continuously operate at least one power generator in response to the movements of a control element susceptible to alternating linear movements deriving from the wave motion. Each operating unit comprises at least a main or driving shaft (11, 12; 11*b*) solidly carrying a driving wheel (13, 14; 13*b*) engaged and placed in rotation by said linear control element (15, 15*b*) and at least two driven shafts (21, 22; 21*b*, 22*b*) operated by the main shaft through a unidirectional drive mechanism (20, 20*b*) and each connectable to at least a power generator.

14 Claims, 9 Drawing Sheets

APPARATUS FOR PRODUCING ELECTRIC OR MECHANICAL ENERGY FROM WAVE MOTION

FIELD OF THE INVENTION

The present invention relates to a system composed of mechanical members for the transformation of a natural or artificial linear or alternating wave motion into a unidirectional rotary motion, in particular for the production of electrical or mechanical energy.

STATE OF THE TECHNIQUE

Mechanical devices for the transformation of an alternating motion into a unidirectional rotary motion of the type assimilable in general, and generally simply defined as being freewheel, are well known. They are used as operation systems for transmitting a unidirectional rotation motion to any coupler or rotating system also when the motion at the source is alternating or discontinuous.

The system proposed here, is configured and is run to take advantage of the wave-motion with the help of at least a floating body, or buoy, specifically for generating electric energy directly from a renewable source, and to re-enter therefore between the apparatus for a production of power without $CO_2$ and/or other polluting emissions In this field of the technique, systems for a production of energy are already known starting from the wave-motion, which however, even if the prerogatives often get elated, they have limits as regards to installation and performance in particular due to their high costs and long amortization periods, as well as in the real productivity capacity. Specifically, if it is considered that a system of the type taken into consideration herein becomes much more valid the shorter its amortization period, the longer are the durations, the economic yield, the simpler the actuation and quantity of energy produced over a period of time, usually a year, and the lower the necessity for maintenance is.

Some of the methods used up to now for the production of energy from wave motion, or tidal energy, have problems connected at least to their efficiency. In fact usually the exploitation of the wave motion is only 50% of its development or capacity, as it is usually limited to the descending or ascending movement of the waves.

For example, in the case of a system named "Aqua Buoy®", the top part of a buoy placed in the water encloses a turbine operated by a pump contained in a leg that is immersed. This system exploits the wave motion to compress sea water, which, directed against the blades of the water turbine, causes it to rotate, provoking the operation of a generator connected to it, and therefore the production of electric energy. The system seems to be advantageous in a so called "oceanic" ambient, that is to say in the presence of considerably high waves, but it cannot have high yields with small applications, in that, passing from a pump followed by a water turbine, substantial loss in loads take place and consequently the power.

A system named "Pelamis", on the other hand, uses and exploits some hydraulic modules that can be found in the junction points of floating casings, connected in such a way that the grating is considerably dimensioned in the order of 150 linear meters. The system can be applied, and is able to guarantee a reasonable yield, only in the cases of very long distances between the waves; in fact, on the contrary, in the presence of a series of small, brief waves it would risk remaining always in an inefficient position. Therefore also this system must necessarily operate in an oceanic ambient to be able to function efficiently or in any case in the presence of relevant wave motion. In a limited context in fact it would be expensive and with a low yield in the production of energy.

A system named "Manchester Bobber®", has dimensions which are comparable to those of an offshore rig, as can also be deduced from WO2006/109024. A system of floats with considerable dimensions is connected to it and is fixed to a supporting structure with solid steel cables. A transmission belt, connected to one of its ends and a stationary constraint and to the opposite end to a float, engages with a gear integral with a shaft. By means of its movement, the float causes an alternating sliding of the transmission belt, which provokes the rotation of the shaft. This system has alternating operating phases in that the float, by means of a free wheel, allows the mechanism to move only in one direction. Therefore 50% of the possible profile yield of the wave is lost, as the rising up is used to reload the system, reaccelerating the genera tor which otherwise tends to slow down.

A plurality of floats enables to compensate for the various inactive phases between them, but a single generator is connected to the single float that exploits the rotation inertia, which, during the inactive phases of said recharging of the cable by the floats during the rising phase, enables a sufficiently adequate rotation to the system to be maintained. The weight of the float that follows the descending movement of the wave restores the positive rotation of the generator.

A system named "OSU®" uses, on the other hand, a linear system with highly efficient Neodymium permanent magnets, rare earth, etc., that exploits wave motion for a direct generation of energy. In this system, however, the moderate motion limits the capacity of the system. In fact, a very low linear speed developed by the wave, corresponds to very low energetic transformation yields.

Another system named "OPT®" uses systems for producing energy that are operated in a vertical direction. Also in this case, the stroke becomes a factor that greatly limits the performance. In fact in the presence of waves higher than the length of the piston rod, they are not adequately exploited for energetic production. Furthermore, the oleodynamic or mechanical deferments present develop friction and substantial losses in capacity.

The document GB 1 116 689 is also indicative of the state of the technique. It concerns a system for obtaining useful energy from sea waves that comprise a casing floating on the waves, a rectilinear flexible system with one end attached to the floating casing and the other end fixed to a counterweight, a pair of toothed meshing wheels each supported by one of two parallel shafts with the interposition of a free wheel mechanism, where each of said shafts also holds another wheel cooperating with the flexible system so a s to turn and cause a rotation in one direction of the shafts in answer to the alternative movement of the flexible system.

However, given its configuration, this system cannot be ma de watertight so as to be placed directly in the water, so much so that it is described to be installed out of the water, on the land.

OBJECTS AND SUMMARY OF THE INVENTION

One objective of this invention is to provide an apparatus to convert a reciprocating motion that is of the waves into electric or mechanical energy, able to avoid the known technical drawbacks and be able to install it not only on the land, but advantageously directly in water, both floating and semi-submerged or submerged, also.

Another objective of the invention is to create the conditions for fully exploiting all the profile of the wave, both when rising and when falling, increasing in this way and effectively the performance and yield of the transformation system in terms of power produced also in the sea or water basins with a limited wave motion.

A further objective of the invention is to provide a system for producing electric or mechanical energy starting from relatively simple and economic reciprocating or wave motion with reduced dimensions, therefore with limited size and low environmental impact.

These objectives are reached with an apparatus for generating power, in particular electric energy, from wave motion in water basins, according to the preamble of claim 1, and wherein at least an operating unit comprises at least a main or driving shaft solidly supporting a driving pulley engaged and placed in rotation by the linear control element and at least two drive n shafts, that is a transmission, operated by at least a main or driving shaft by means of a unidirectional pull mechanism, or free wheel, and each connectable to at least a power generator.

The apparatus of the invention can be made with two parallel units, side by side, interacting between them or with two units placed in line. In the first case the apparatus has two main or driving shafts, both parallel operated by the linear control element and, for every main shaft, at least an output shaft operated by the main shaft through a free wheels mechanism. In the second case the apparatus comprises a single main shaft powered by the linear control element and, at the opposite ends of the main shaft, two driven shaft, each operated by the main shaft by means of a free wheel mechanism.

This apparatus being however ductile and versatile, enables energy to be obtained with a high efficiency, low economic investments and limited need for maintenance, from renewable sources such as the natural wave motion in oceans and seas or also artificial created in artificial basins, without however excluding mechanical sources such as lifts, cable railways and the like.

Furthermore, the apparatus of the invention is modulatable, it can be inserted in an ambient with wave motions of any amplitude, height and season, in that they have yields clearly superior to those of the systems known up to now. In addition it is auto-levelling; able that is to automatically adapt itself to the variations of the seas and their level and to follow within certain limits also the lengths of the waves without losing efficiency.

BRIEF DESCRIPTION OF THE DRAWINGS

The invention will however be explained in greater detail in the course of the description provided in reference to the enclosed illustrative schematic drawings, supplied just as an indication and not restrictive, in which.

DETAILED DESCRIPTION OF THE INVENTION

Figure 1:
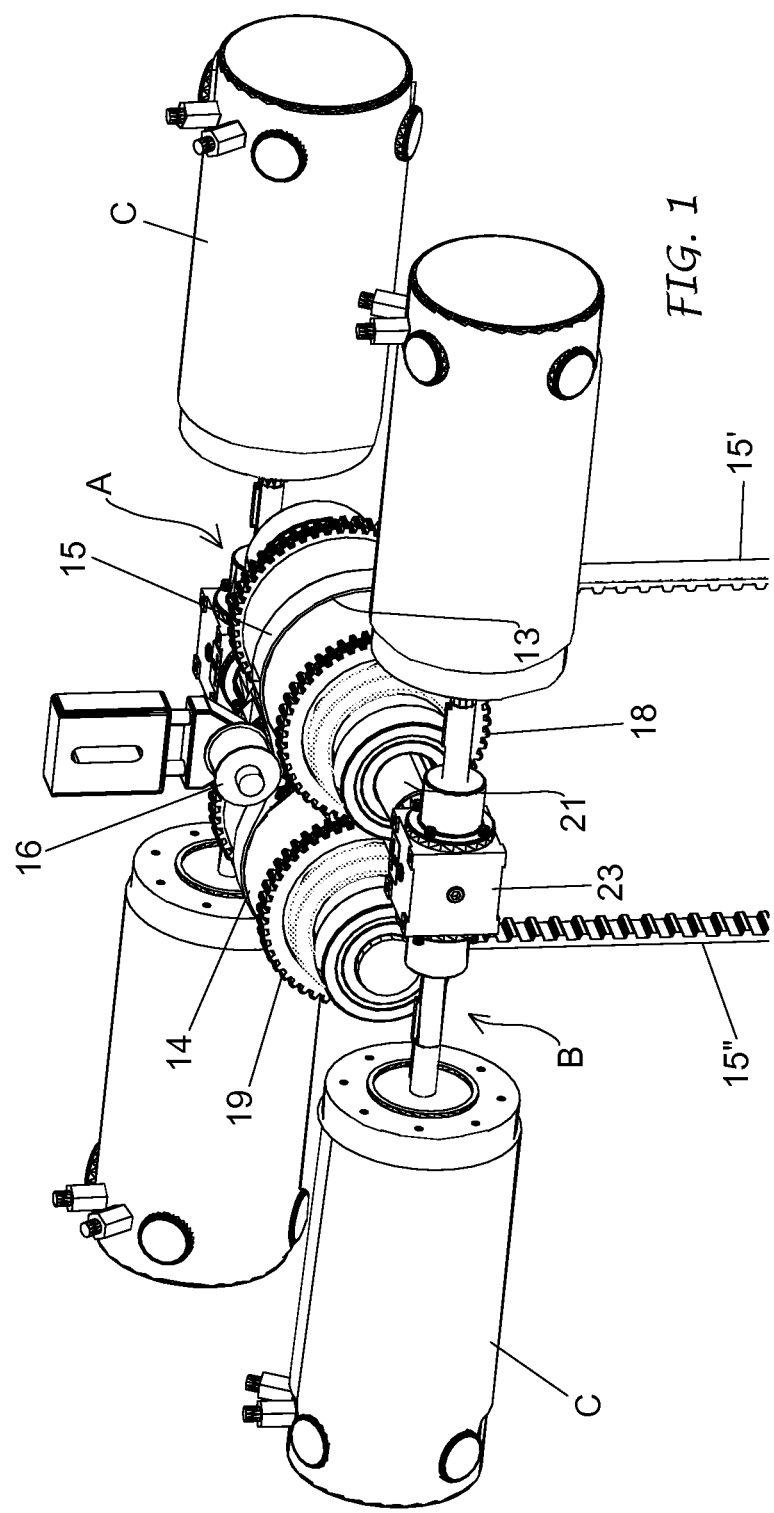
FIG. 1 shows, in perspective, a view of the whole of the system of the invention according to an example.
Figure 2:
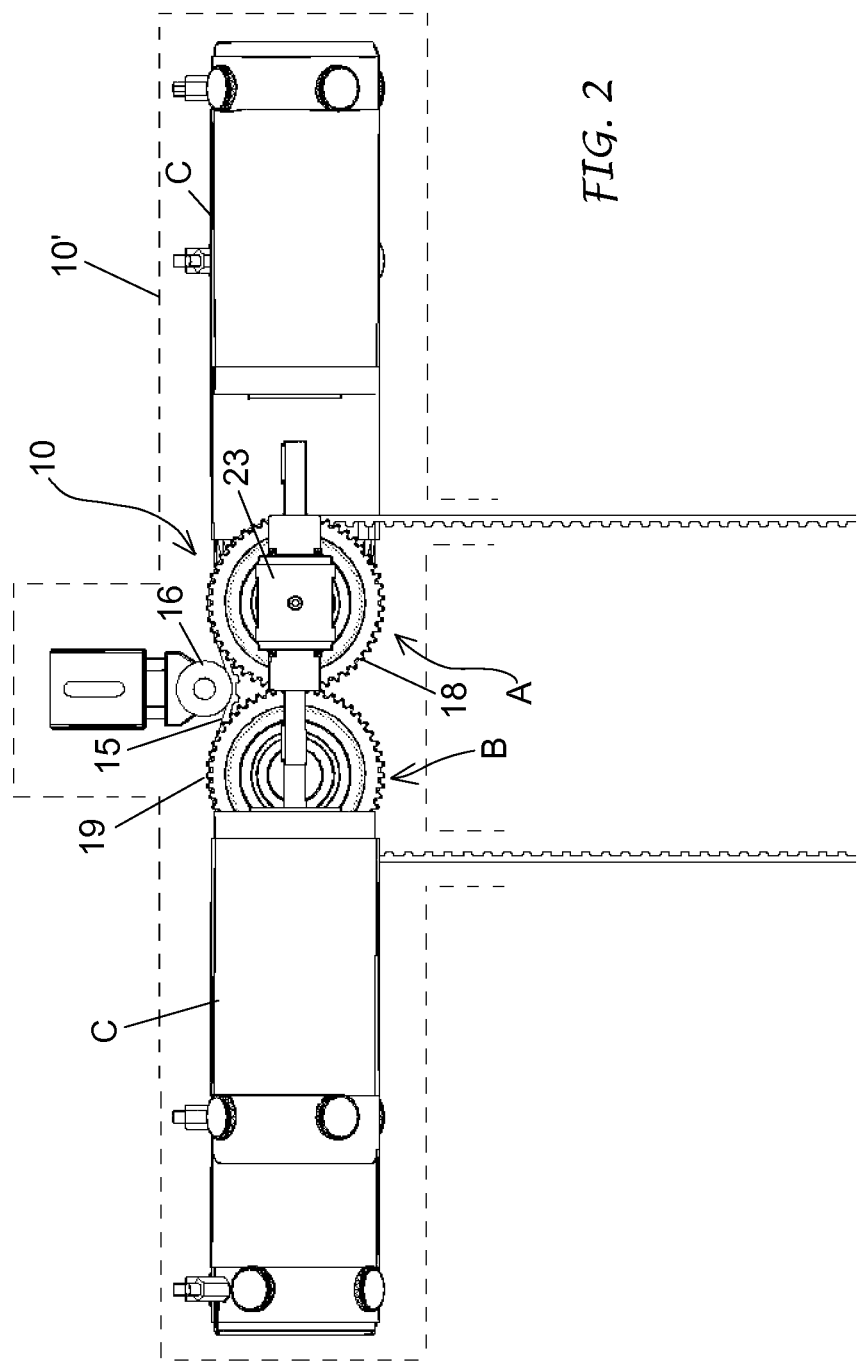
FIG. 2 shows a side view of the system in FIG. 1.
Figure 3:
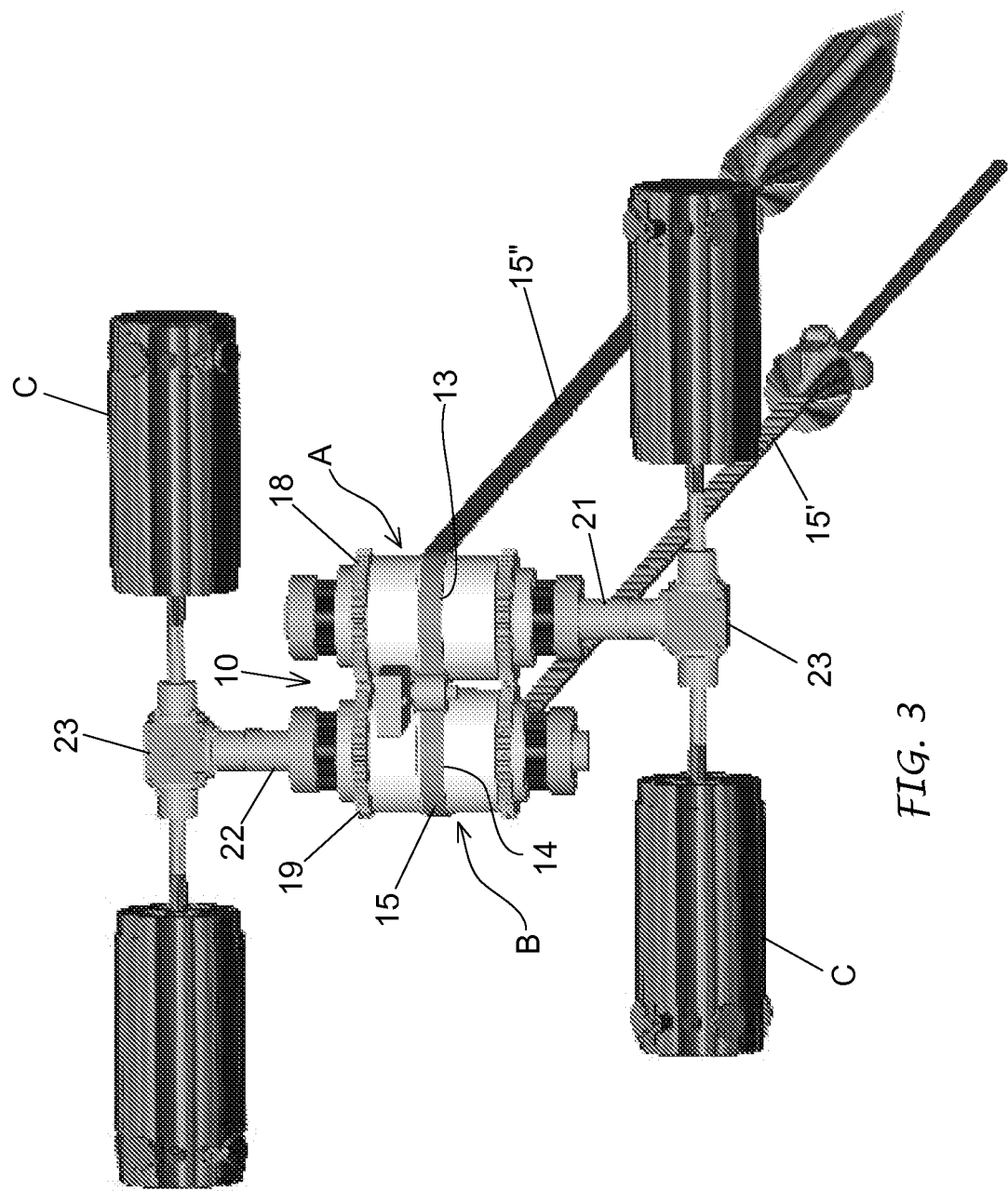
FIG. 3 shows a foreshortening view from above of the system in one of its configurations.
Figure 4:
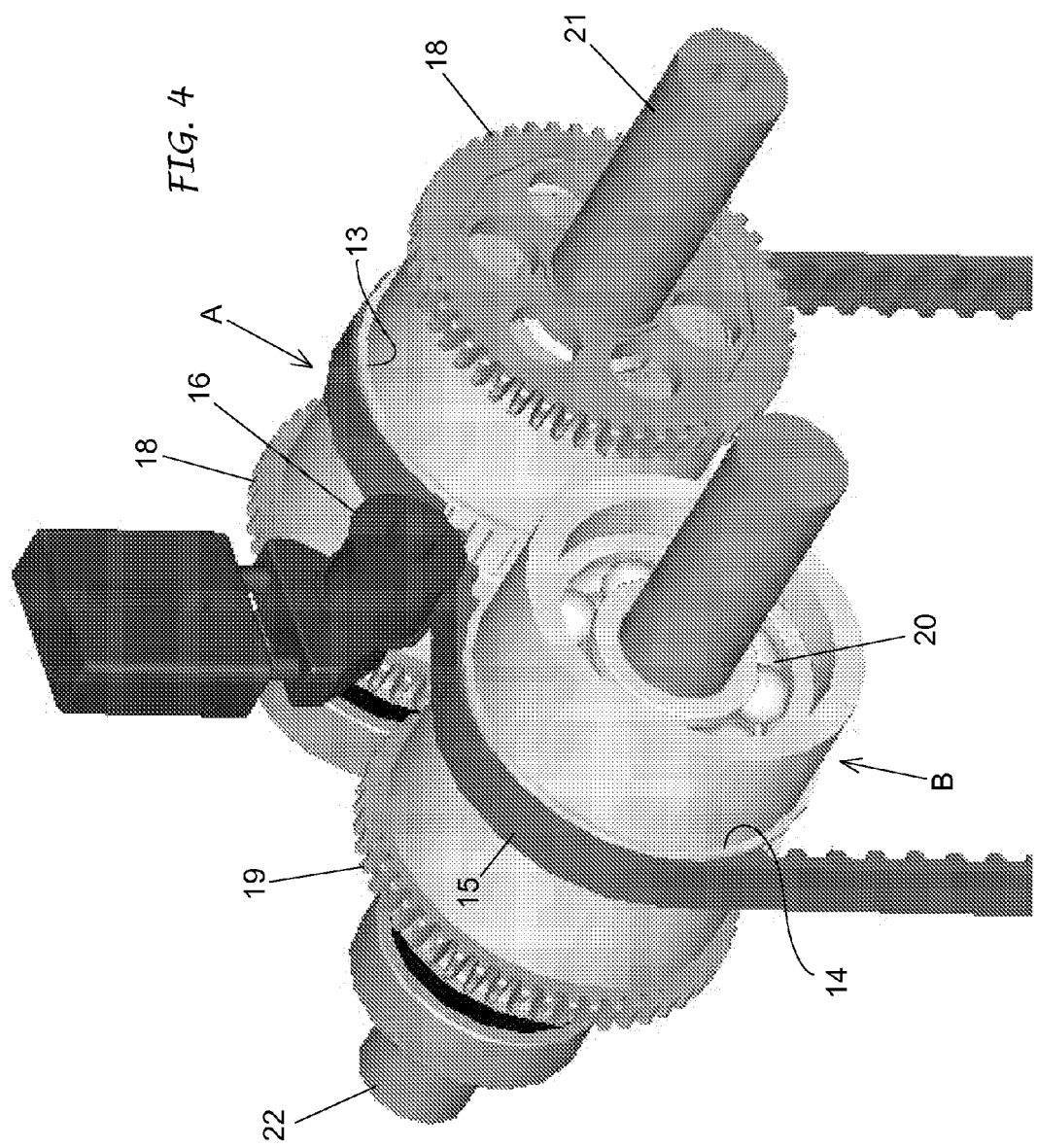
FIG. 4 shows a partial view of the system with a split to highlight a one-way drag mechanism.
Figure 5:
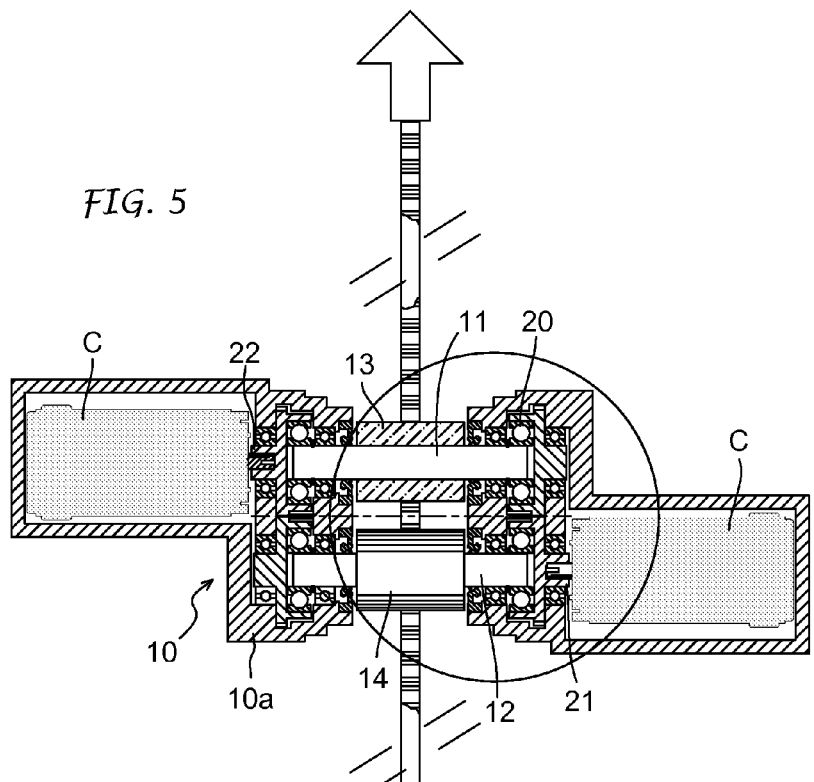
FIG. 5 shows a cross-section view of the two operating units of the system in FIG. 1.

The apparatus of the invention represented in FIGS. 1-5 and indicated globally by 10 basically comprises two operating units A and B, parallel side by side, designed for a production of electric energy, each one by means of one or more power generators C, starting from an alternating linear motion or, more in particular, from the movement of the surface of the water in oceans, seas and lakes.

The apparatus comprises two main or driving shafts 11, 12, one for each operating unit A and B, parallel and supported in rotation on respective bearings 11', 12' carried by a crankcase or casing 10'.

In the example represented, a first operating unit A is fixed to the main shaft 11, and consequently rotating with it, a driving wheel 13 positioned in correspondence, that is coplanar, to a corresponding driving wheel 14 fixed to the main shaft 12 of the other operating unit B. The two driving wheels 13, 14 can be made up of gear wheels or driving pulleys, but they are however radially at a distance so that, when turning, they do not interfere one with the other.

The two driving wheels 13, 14 arranged in this way are engaged at the same time by a linear control element 15 subject to basically rectilinear alternating movements. If the driving wheels 13, 14 are gear wheels, the linear control element 15 can be made up of a toothed belt, a toothed bar, a chain or the like; if the driving wheels are pulleys, the linear control element 15 can be made up of a "V" belt, a cable or a rope.

The control element 15 is however associated and engages at the same time both driving wheels 13, 14 with the help of a idler 16.

The control element 15 extends with two branches 15', 15" from opposite parts of said driving wheels so that their alternating movements correspond to a rotation of said two driving wheels and together with them the main shafts 11, 12 of both the operating units A and B in the same direction, even if alternatively in opposite directions, clockwise and anti-clockwise. The alternating movements of the control element 15 are caused by the application of a force alternatively to one and/or the other of its branches, the one that can be the force deriving from the movement of a floating body, connected to one of the branches 15' or 15" of said control element 15 and which follows the profile of t he waves in a water basin, contrasted by a resistant force or balance weight attached to the other branch of the same control element.

To the main shaft 11, 12, or equivalently to the driving wheel 13, 14, of each operating unit A and B at least one or, preferably, two toothed driven wheels 18 and 19, respectively, as shown in the drawings is also associated axially. When the two toothed driven wheels 18 and 19 are associated with each shaft 11, 12, they are preferably positioned symmetrically from opposite parts of the driving wheel 13, 14. The or each toothed driven wheel 18 associated with a shaft 11 of an operating unit A is dimensioned so as to be constantly in mesh, that is to say al ways engaged, with a correlative toothed wheel 19 associated with the other shaft 12 of the other operating unit B Each toothed driven wheel 18 and 19, however, is not constrained directly to the respective main shaft 11, 12, but it is constrained with the interposition of a unidirectional drive mechanism 20 so as to cause a positive rotation of the toothed driven wheel only with the rotation of the respective driving wheel and relative main shaft in one direction and to decouple it, leaving it idle, during the rotation of the driving wheel and relative main shaft in an opposite direction. Such a drive mechanism 20 can be made up of a unidirectional bearing or of a free wheel and can be mounted concentrically between the main shaft and each toothed driven wheel or, as an alternative, between the toothed driving wheel or pulley and each coaxial toothed driven wheel. The unidirectional drive mechanism will however have a driving portion, generally internal, connected depending of the cases on the main shaft or on the toothed driving wheel or pulley and a driven part, usually external, joined to the toothed driven wheel to move in one direction only. The sagacity to be respected, however, is that the unidirectional drive mechanism 20 for every toothed driven wheel working with a first main shaft 11 must be contrary as regards to the unidirectional drive mechanism for each coaxial toothed driven wheel to the other main shaft 12. So, apart from the rotation direction of the driving wheels 13, 14 being from time to time clockwise and anticlockwise caused by the control element 15 which moves alternatingly, the toothed driven wheels 18 that work with the main shaft 11 of the operating unit A always turning in the same direction, whereas the toothed driving wheels 19 working with the main shaft 12 of the other operating unit B also always turn in one direction, but in a direction opposite to the one of the first operating unit they are continually coupled to.

Each toothed driven wheel 18 and 19 is constrained and turns with its own driven shaft 21 respectively 22, acting as a transmission shaft, by means of which, the toothed driven wheel (if single) or at least one of the toothed driven wheels (if there are two) of each operating unit A and B it can be connected and operate, by means of a coupling and/or a turns multiplier 23, at least one power generator C, in particular for the production of electric energy to be supply to electric accumulators and/or any utilizer.

In the example shown in FIGS. 7-10, where identical or equivalent parts to those of the apparatus described above regarding the FIGS. 1-5 are indicated with the same reference numbers with the addition of the letter "b", the apparatus 10b comprises a single main or driving shaft 11b that carries a driving wheel 13b. Said main shaft is supported by a bearings 11'b and the driving wheel 13b is engaged by a control element 15b—FIG. 9—with the help of a possible idler 16b. Also in this case the control element 15b will be connected on one part to a floating body and on the other to a balancing/tensioning force or counter weight and susceptible to alternating linear movements so as to cause the main shaft to rotate.

This main shaft 11b works with toothed driven wheels 18b, 19b, one at each of its ends, each one constrained to a respective transmission shaft 21b, 22b, supported by at least one bearing and connectable to a power generator, in particular to an electric generator Cb.

Every driven wheel 18b, 19b is connected to the main shaft 11b by means of a unidirectional drive mechanism or free wheel 20b so that the rotation of the main shaft caused by the control element 15b corresponds to the rotation of the driven wheels 18b, 19b each with the respective transmission shaft 21b, 22b. So that each transmission shaft 21b, 22b always turns in the same direction in spite of the alternating clockwise and anti-clockwise rotation of the driving wheel 13b and consequently the main shaft 11b caused by the control element 15b provided with alternating linear movements, the two toothed driven wheels 18b, 19b, in the example represented, have helical teething and both mesh with the crown gear 50 opportunely supported.

Of course either one or the other way of construction of the apparatus of the invention can be provided with variations or detailed changes without them moving away from the scope of the invention, the main objective being to obtain usable power from reciprocating motion, in particular from wave motion, fully exploiting both the ascending and descending profile of the waves, to cause however a unidirectional rotation of one or more power generators, especially for the production of electric energy.

As regards to the use, every apparatus of the invention can be enclosed, also sealed, in the crankcase or protection casing, allowing the two branches of the movable control element susceptible of alternating linear motion to pass through. Then, it may be able to find different ways of installing within the ambient of the water basin and in the presence of wave motion.

In fact, the apparatus 10 or 10b can be installed and used at least out of the water, floating, semi-submerged or submerged.

Figure 11:
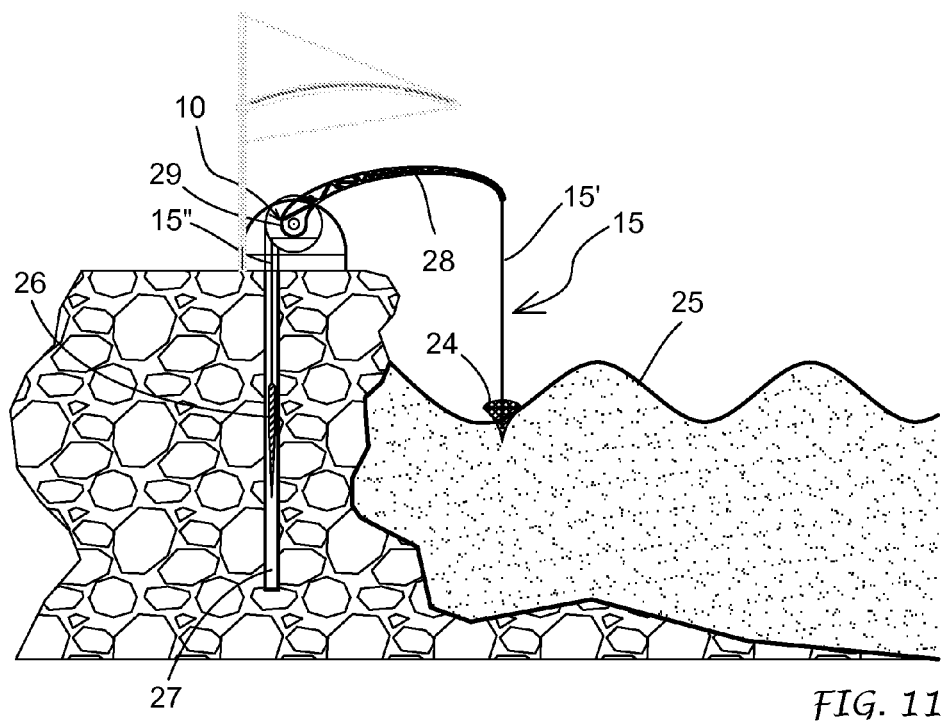
FIGS. 11, 12, 13 and 14 show as many, different installation forms in use of the system according to the invention.
Figure 12:
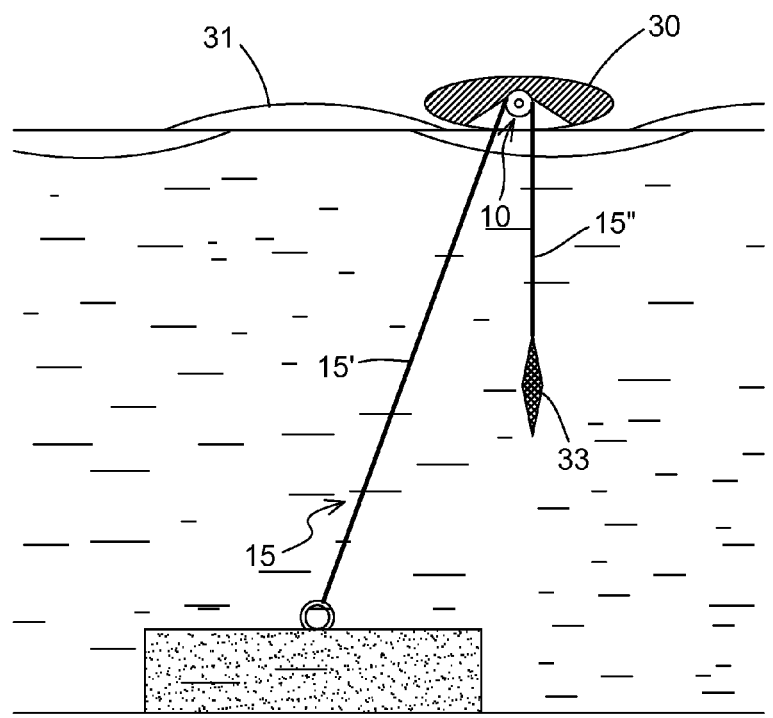

An installation out of the water can be useful in areas where the bottoms are difficult to reach as well as near ports, cliffs and the like. As shown schematically in the example in FIG. 11, the apparatus is positioned on the ground and to a branch 15' of the linear control element 15 or 15b is connected a floating body 24 lowered onto the surface of the water 25 to follow the wave motion, whereas to the other branch 15" of s aid control element 15 or 15b is connected a balance weight 26 which can be guided into a well 27. So, on one hand the floating body 17 has to follow the profile of the waves causing together with the balance weight 26 on the other hand an alternative shift of the control element 15 and, by this, the operating of the gearing of the apparatus equal to the control of the electric generators connected as said before to the apparatus itself. Both one and the other of the two branches 15', 15" of the linear control system 15 or 15b can be differently delayed and according to needs on respective guide structures 28, 29.

Figure 6:
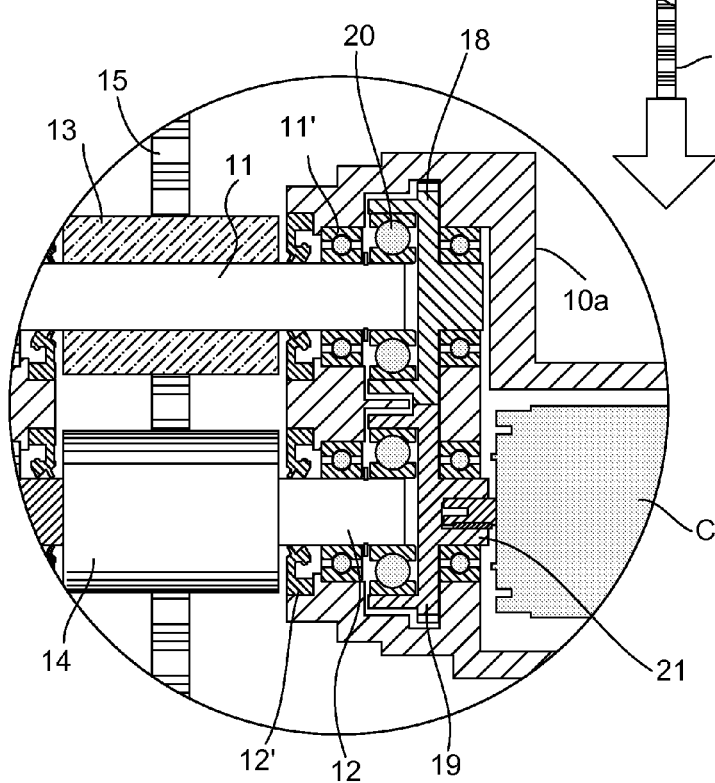
FIG. 6 shows an enlarged view of the detail circled in FIG. 5.
Figure 7:
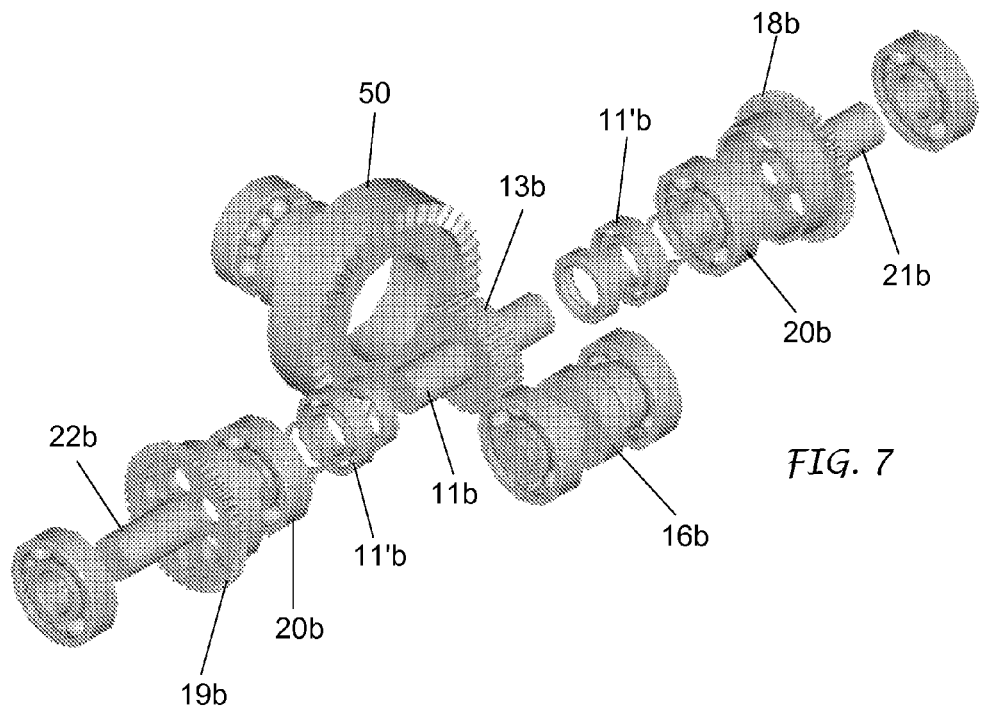
FIG. 7 shows a blow up view of the parts of the system of the invention according to another example.
Figure 8:
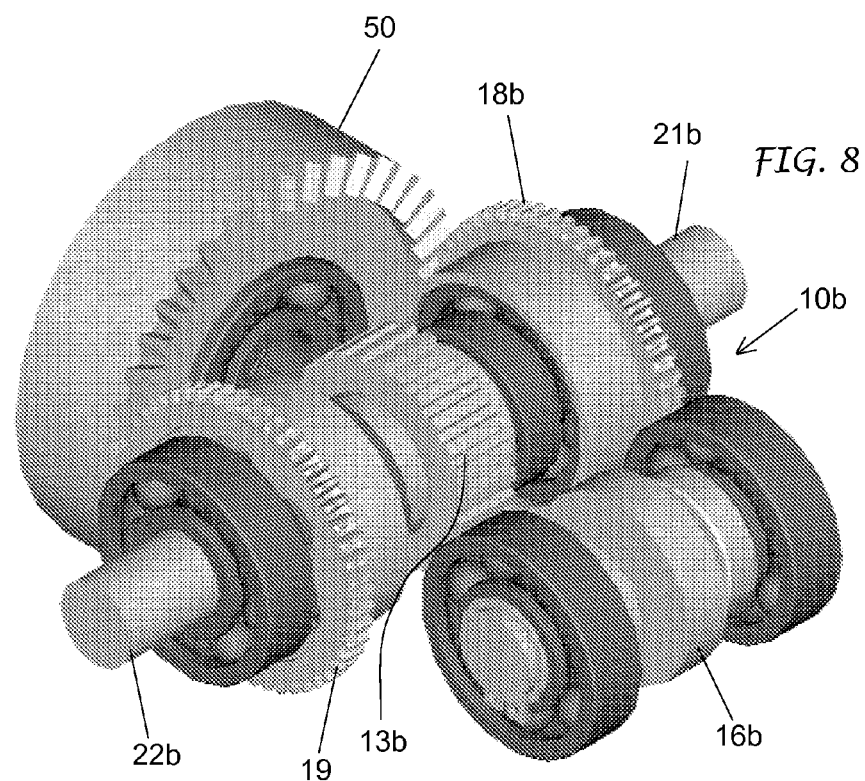
FIG. 8 shows a view in perspective of the system in FIG. 7, when assembled.
Figure 9:
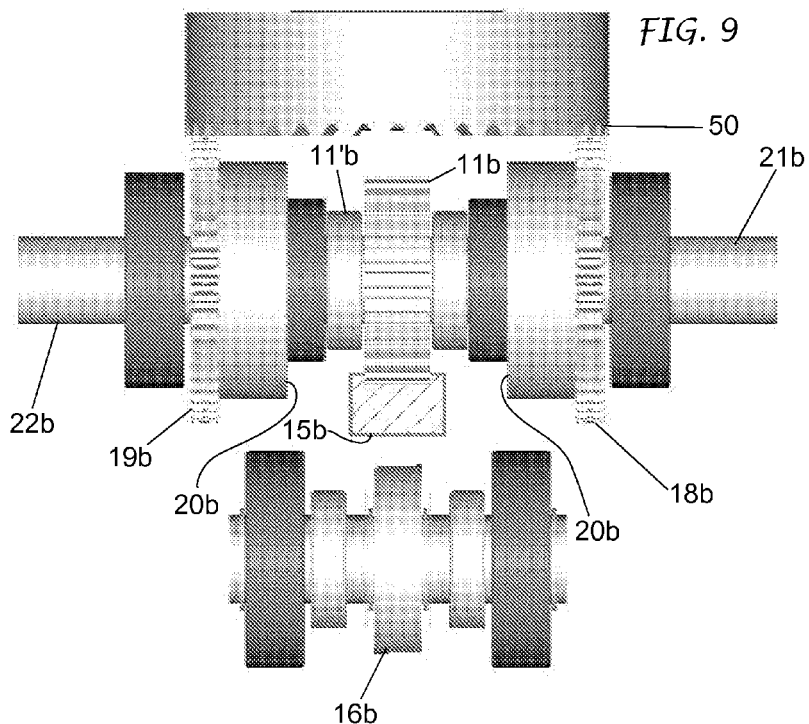
FIG. 9 shows a view on a level of the system in FIG. 8.
Figure 10:
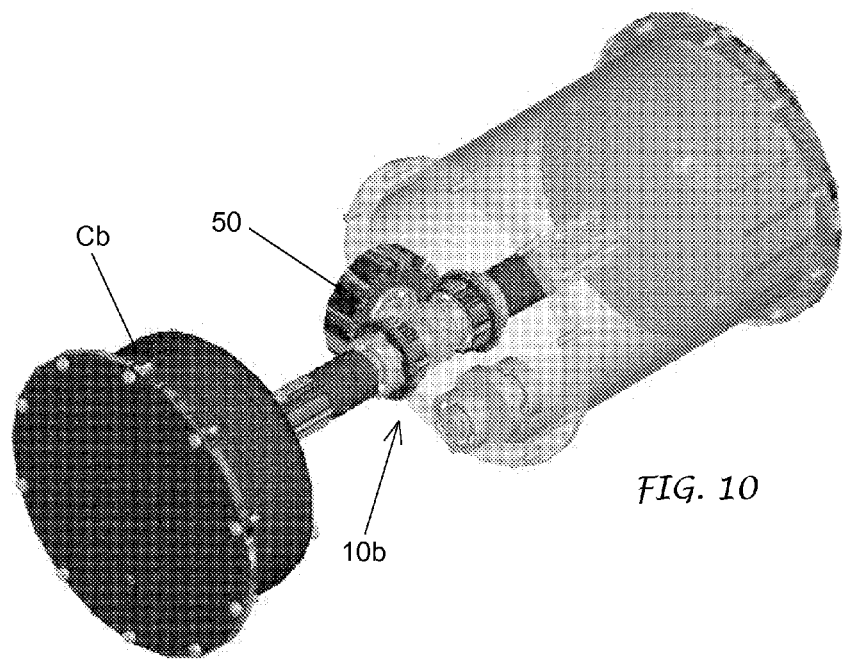
FIG. 10 shows a whole of the system in FIGS. 7-9 complete with electric power generators.

For its floating installation, the l'apparatus 10 or 10b is mounted on board a floating body or buoy 30 that follows the wave motion 31 as shown for example in FIG. 6. In this case, the end of a branch 15' of the linear control element 15 or 15b can be connected to an anchoring block 32 on the bottom of the water basin and to the end of the other branch 15" of said control element a weight 33 will be connected. So, the apparatus follows as one the floating body or buoy 30 the surface movement of the water, so the control element, thanks to the weight 33 slides alternately in opposite directions causing the drive of the gearing of the apparatus and by this the unidirectional and continual rotation of the connesive electric generators.

Figure 13:
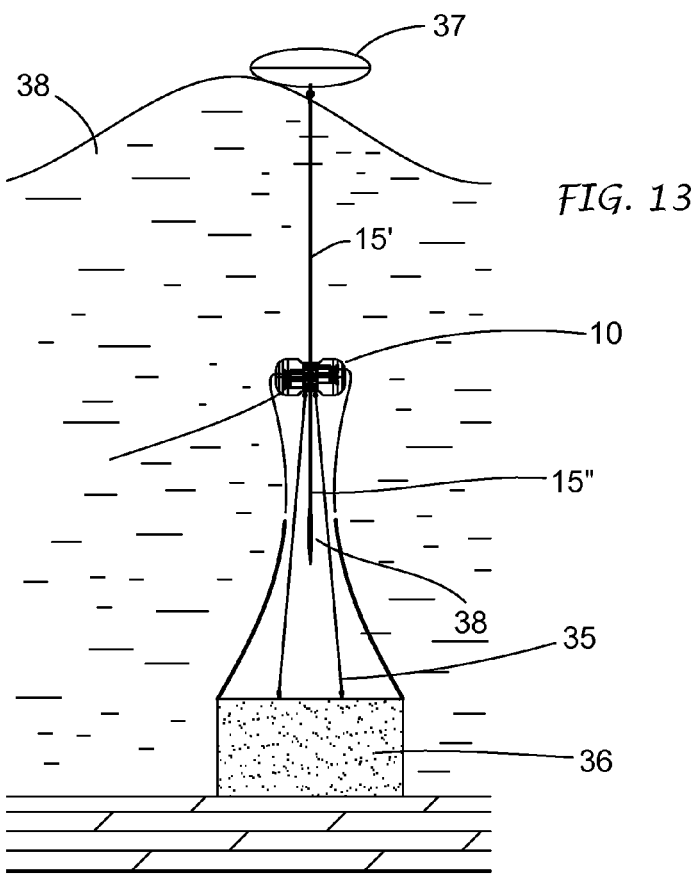

In a semi-submerged installation such as shown for example in FIG. 13, the apparatus 10 or 10b can be placed on board a depth buoy 34 connected by anchoring cables 35 to a ballast block 36 on the bottom of the water basin. The end of a branch 15' of the linear control element is connected to a floating body or buoy 37 on the wavy surface of the water basin, while the end of the other branch 15" of said control element is connected to a balancing weight 38. So, on the one hand the apparatus on board the depth buoy 34 will be kept at an almost constant height, whereas on the other hand the floating body or buoy 37 following the profile of the waves, in combination with the balancing weight 38, causes an alternative sliding of the linear control element 15 and, by means of this, the drive of the gearing of the apparatus and consequently the unidirectional and continuous command of the electric generators connected to the driven shafts.

Figure 14:
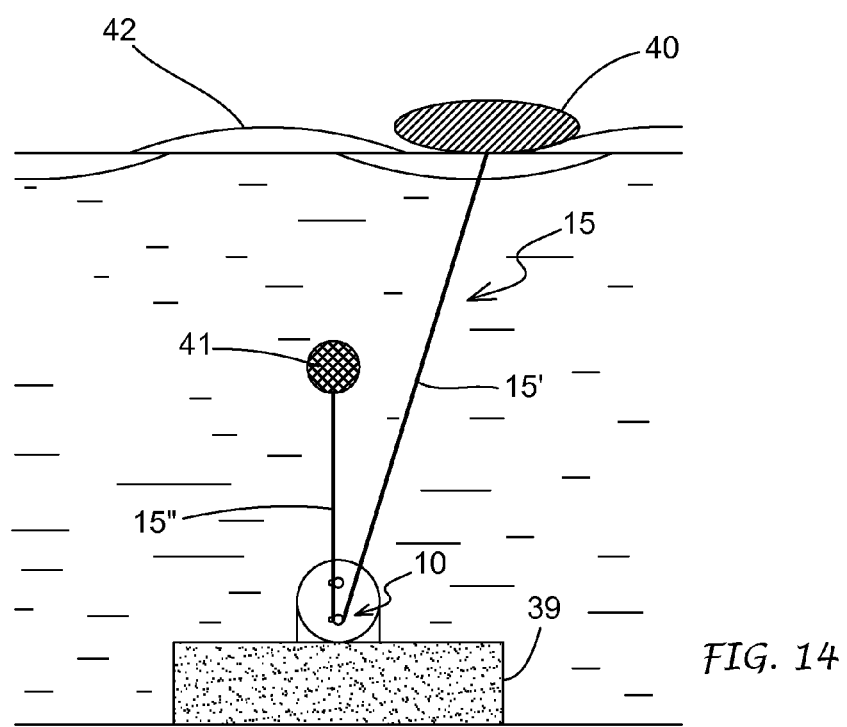

In an immerged installation such as the one shown for example in FIG. 14, the apparatus 10 or 10b can be fixed to a stationary block 39 placed on the bottom of the water basin, the end of a branch 15' of the linear control element is connected to a floating body or buoy 40, whereas the end of the other branch 15" of said control element is connected to a submerged tension buoy 41. Also in this case, the floating body or surface buoy 40, following the wave motion 42 causes, in combination with the action of the submerged tension buoy 41, an alternative sliding of the control element 15 or 15b and consequently the drive of the gearing of the apparatus itself and the continuous and unidirectional control of the electric generators.

The apparatus of the invention, even if not shown, could moreover find further ways of application in use. For example, it could be used in combination with the so-called floating beacons. Furthermore it can be used singularly, or in a group with elements 15 or 15b of all the grouped apparatus can be linked to a single floating body designed to follow the wave motion and to therefore operate all the apparatus together to maximize the production of energy.

The apparatus can also have different shake and dimensions, according to the characteristics of the wave motion and the quantity of energy to be produced. It can also be trans portable, for example with a rucksack, for local installation, even transient, where modest quantities of energy coming from wave motion are required.

The installations can be provided with GPS or sonar signallers so as to be detected or recovered in the sea even should they become unhooked from the retaining systems. They may also be provided with detecting systems and data memorisation, such as the height of the waves, water temperature, recording of the energy produced etc.

The invention claimed is:

1. An apparatus for generating power, in particular electric energy, from wave motion in water basins, the apparatus comprising:
    at least an operating unit, including gearing provided for unidirectional rotation and for continuous operating of at least a power generator in response to movements of a control element susceptible to basically linear alternating movements, said control element being connected to at least a floating body or buoy resting on a surface of water and said control element being connected to a balancing/tensioning member that makes the floating body or buoy follow a profile of waves, said at least one operating unit comprising at least a main or driving shaft solidly carrying a driving wheel engaged and made to rotate by said linear control element and at least two driven or transmission shafts operated by said at least said main or driving shaft through a unidirectional drive mechanism and each of said at least two driven or transmission shafts being connectable to said at least said power generator, wherein said at least one operating unit comprises:
    two toothed driven wheels at opposite ends of said main shaft, each toothed driven wheel being connected to a respective driven shaft connectable to said power generator, said unidirectional drive mechanism connecting each driven wheel to said main shaft such that rotation of the main shaft caused by the control element corresponds to rotation of the toothed driven wheel; and
    a crown gear in mesh with one or more of said toothed driven wheels.

2. An apparatus according to claim 1, wherein the driving wheel of each of said operating units is a toothed wheel or a pulley and the control element is a toothed belt, a chain, a rope or a cable.

3. An apparatus according to claim 1, wherein the apparatus is enclosed in a sealed crankcase or casing.

4. An apparatus according to claim 1, wherein the apparatus is provided for an installation on the mainland, wherein at least the floating body lowered in the water from above to follow the movement of the waves, is connected to a branch of the control element, wherein a balancing weight guided in a well is fixed to another branch of said control element.

5. An apparatus according to claim 1, wherein the apparatus is provided for an installation on board the floating body placed in the water to follow the movement of the waves, wherein a branch of the control element is attached to a stationary block, wherein another branch of said control element is connected to said balancing/tensioning member.

6. An apparatus according to claim 1, wherein the apparatus is provided for installation on board a depth buoy anchored to a stationary block, wherein a branch of the linear control element is connected to the floating body placed on the water to follow the wave motion, wherein said balancing/tensioning member is connected to an end of another branch of said control element.

7. An apparatus according to claim 1, wherein the apparatus is provided for installation on a submerged stationary block, wherein a branch of the control element is connected to a casing body on the water to follow the wave motion, wherein another branch of said control element is connected to a depth balancing buoy.

8. An apparatus according to claim 1, wherein the unidirectional drive mechanism is positioned between the main shaft and each toothed driven wheel linked to said main shaft.

9. An apparatus according to claim 8, wherein the unidirectional drive mechanism is a unidirectional bearing or a free wheel.

10. An apparatus for generating power from wave motion in water basins, the apparatus comprising:
    at least an operating unit, including gearing provided for unidirectional rotation and for continuous operating of at least a power generator in response to movements of a control element susceptible to basically linear alternating movements, said control element being connected to at least a floating body or buoy resting on a surface of water and said control element being connected to a balancing/tensioning member that makes the floating body or buoy follow a profile of waves, said at least one operating unit comprising at least a main or driving shaft solidly carrying a driving wheel engaged and made to rotate by said linear control element and at least two driven or transmission shafts operated by said at least said main or driving shaft through a unidirectional drive mechanism and each of said at least two driven or transmission shafts being connectable to said at least said power generator; and
    another operating unit to provide two operating units, each of said two operating units having one said main shaft, one said driving wheel coupled to said main shaft, at least a toothed driven wheel actuated by said unidirectional drive mechanism, and a driven shaft of motion from said toothed driven wheel to at least one power generator, wherein:
        the driving wheel of one operating unit is spaced and disengaged radially by the driving wheel of the other parallel operating unit;

at least one toothed driven wheel of one operating unit is constantly in mesh with a corresponding toothed driven wheel of the other parallel operating unit;

the control element is deferred onto the driving wheels of the two operating units to cause rotation of said driving wheels, both in one direction, in response to a movement in a first direction of the control element provided with reciprocating movement, and both in opposite directions, in response to the movement in a second direction of the control element provided with reciprocating movement; and the unidirectional drive mechanism causes continuous unidirectional rotation of each toothed driven wheel and the relative driven shaft apart from the movement direction of said control element.

11. An apparatus according to claim 10, wherein said control element engages with the driving wheels of both the operating units by means of an idler, the control element having two branches that extend from opposite parts of said driving wheels respectively connectable to the floating body following the wave motion and to the balancing/tensioning member of the control elements.

12. An apparatus according to claim 10, wherein the driving wheel of each of said operating units is a toothed wheel or a pulley and the control element is a toothed belt, a chain, a rope or a cable.

13. An apparatus for generating power from wave motion in water basins, the apparatus comprising:

at least an operating unit, including gearing provided for unidirectional rotation and for continuous operating of at least a power generator in response to movements of a control element susceptible to basically linear alternating movements, said control element being connected to at least a floating body or buoy resting on a surface of water and said control element being connected to a balancing/tensioning member that makes the floating body or buoy follow a profile of waves, said at least one operating unit comprising at least a main or driving shaft solidly carrying a driving wheel engaged and made to rotate by said linear control element and at least two driven or transmission shafts operated by said at least said main or driving shaft through a unidirectional drive mechanism and each of said at least two driven or transmission shafts being connectable to said at least said power generator, wherein the unidirectional drive mechanism is positioned between the main shaft and each toothed driven wheel linked to said main shaft.

14. An apparatus according to claim 13, wherein the unidirectional drive mechanism is a unidirectional bearing or a free wheel.

* * * * *